Patented May 8, 1951

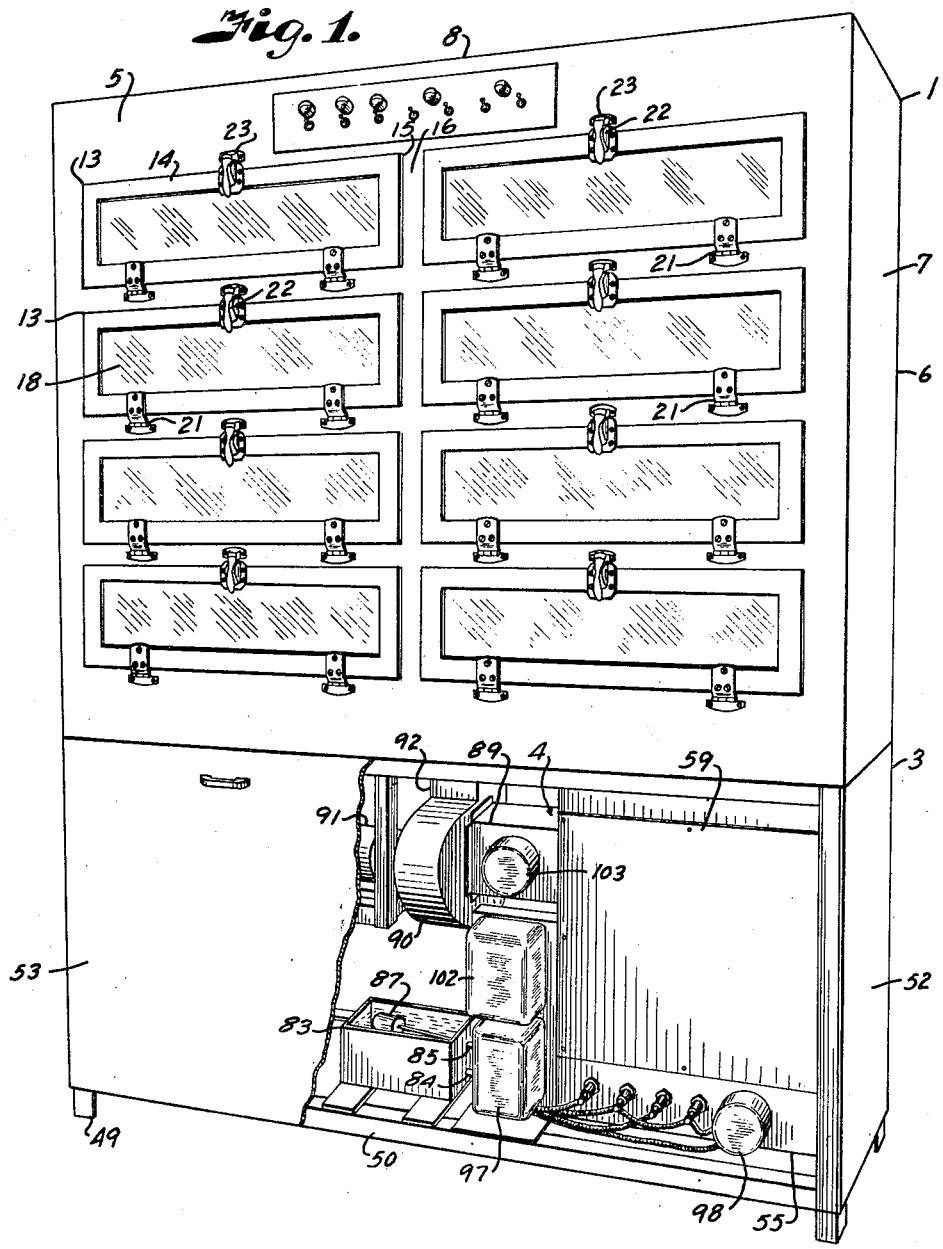

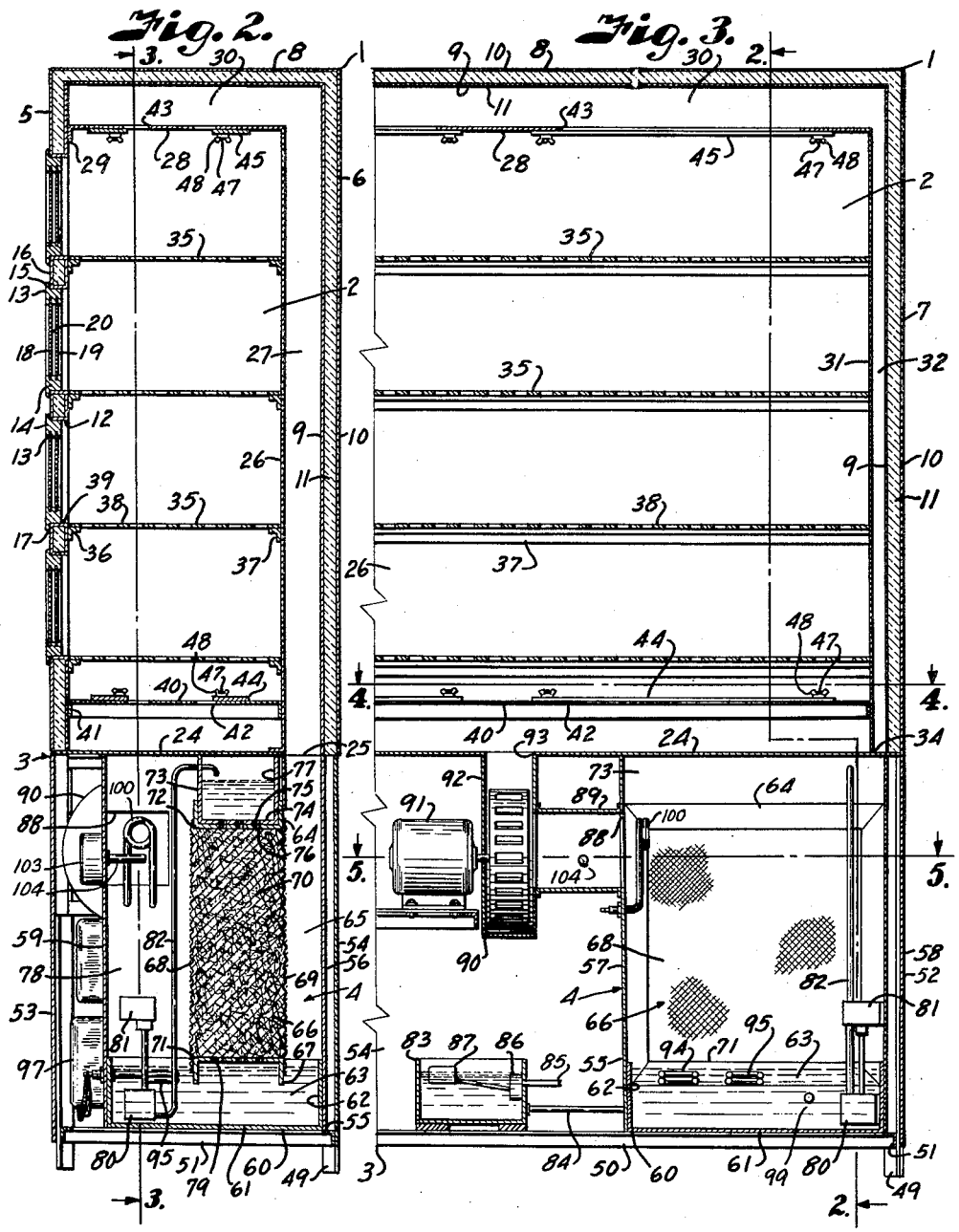

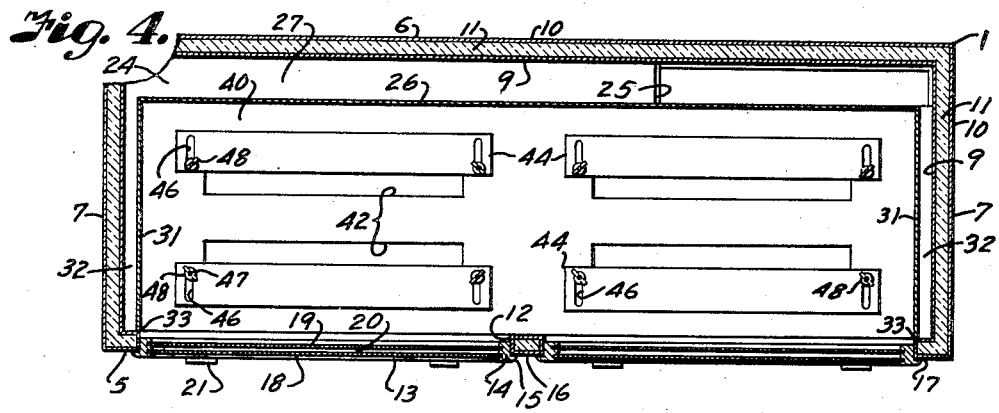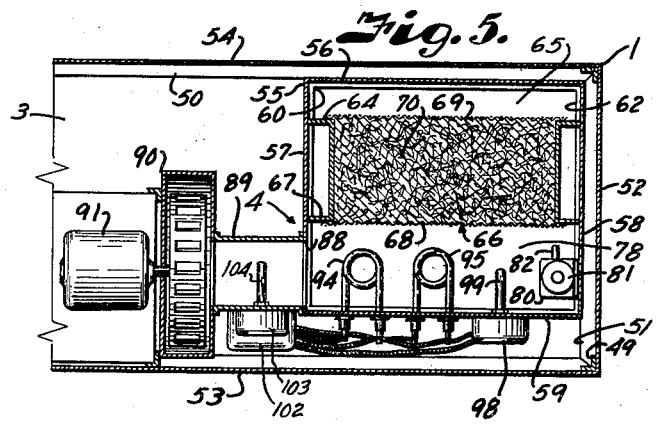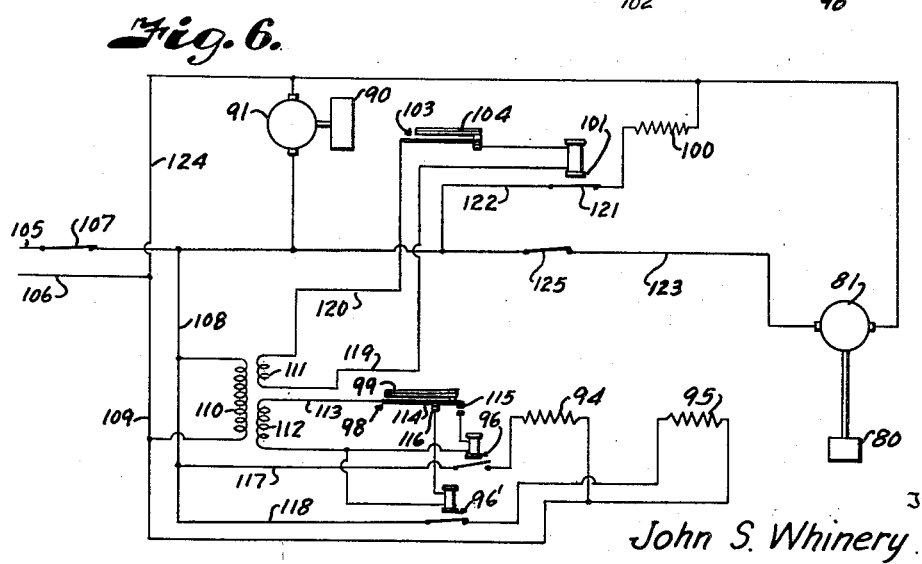

2,552,387

UNITED STATES PATENT OFFICE 2,552,387

STORAGE CABINET HAVING HUMIDITY AND TEMPERATURE MAINTENANCE APPARATUS THEREIN

John S. Whinery, Kansas City, Mo.

Application August 11, 1947, Serial No. 768,002

5 Claims. (Cl. 34—46)

This invention relates to storage cabinets having humidity and temperature maintenance apparatus therein, and more particularly to cabinets for proofing dough, incubating bacteria, and treating materials requiring periods of exposure to air, having regulated humidity and temperature.

The objects of the present invention, therefore, are to provide a cabinet and apparatus therein to maintain uniform temperature and humidity conditions throughout the storage space; to provide apparatus for saturating air, reducing the humidity to a required degree, at a controlled temperature, and passing the conditioned air through the storage space of a cabinet; to provide a cabinet structure for receiving high humidity air without condensation forming on the walls; to provide a cabinet with apparatus for conditioning and recirculating air therethrough; to provide for uniform flow of humidified air throughout the storage space; to provide accurate control of humidity and temperature of circulated air in a cabinet for proofing dough and the like; to provide a storage cabinet with electric controls and devices for humidifying air with hot water and no steam; and to provide an attractive cabinet structure and air-conditioning apparatus therein that is efficient, easy to operate, economical to manufacture, and capable of long periods of use without attention.

In accomplishing these and other objects of the present invention, I have provided improved details of structure, the preferred form of which is illustrated in the accompanying drawings, wherein:

Fig. 1 is a perspective view of a cabinet having humidity and temperature maintenance apparatus embodying the features of the present invention, the closure of the lower portion of said cabinet being broken away to better illustrate the positioning of the air-conditioning apparatus.

Fig. 2 is a vertical transverse sectional view through the cabinet and air-conditioning apparatus on the line 2—2, Fig. 3.

Fig. 3 is a partial vertical longitudinal sectional view through the cabinet and apparatus on the line 3—3, Fig. 2.

Fig. 4 is a horizontal sectional view through the storage portion of the cabinet taken on the line 4—4, Fig. 3.

Fig. 5 is a horizontal sectional view through the air-conditioning apparatus on the line 5—5 Fig. 3.

Fig. 6 is a diagrammatic view of the electrical equipment and controls for regulating the humidity and temperature of the air circulated through the cabinet.

Referring more in detail to the drawings:

I designates a cabinet enclosing a storage space 2 preferably located in the upper portion thereof, the lower portion 3 of said housing preferably enclosing suitable air-conditioning equipment 4 and controls therefor. The upper portion of the cabinet preferably consists of front, back, side and top walls 5, 6, 7 and 8 respectively, each of said walls preferably consisting of spaced sheets 9 and 10 of suitable metal, such as aluminum, suitable insulation 11 being located between the sheets.

The insulated walls 5 to 8 inclusive may be of any suitable size to form a convenient enclosure for the material to be treated, however, in the form of the device illustrated the length and height of the upper portion of the cabinet are substantially the same and the side walls are of relatively narrow width whereby the cabinet may be placed against the wall of the laboratory or the like and not extend excessively into the room, the space enclosed by the walls preferably being such that a large amount of material may be placed in the storage space in easy reach of a person inserting, removing, or inspecting the material being treated.

The front wall 5 is preferably provided with a plurality of openings 12, illustrated as being rectangular in shape, arranged in spaced vertical and horizontal rows. Each of said openings is provided with closure members 13 consisting of frames 14 of such size as to enter the openings 12, said frames being provided with outwardly projecting flanges 15 adapted to overlie the outer face 16 of the front wall 5. A suitable sealing member 17 is preferably applied to the flange 15 to form a seal between the closure member and the wall surrounding the opening 12.

Suitably mounted in the frames 14 are spaced, transparent panels 18 and 19, said panels being sealed in the frames to provide an air space 20 therebetween, whereby the doors tend to insulate the interior of the cabinet yet provide vision of the condition of the material therein. Each of the closure members 13 is preferably provided with suitable hinges 21 for pivotally mounting the closure member on the front wall 5 of the cabinet, the opposite portion of said closure member having a latch 22 adapted to engage the keeper 23 for holding the closure member in sealed relation to the openings into the cabinet, said latches being such that access may be readily had to the interior of the cabinet.

The upper portion of the cabinet is provided with a bottom 24 preferably consisting of a sheet of metal suitably secured adjacent the lower end of the insulated wall 5 and extending rearwardly therefrom, the rear edge of said bottom being suitably secured to the rear wall 6, said bottom having an opening 25 for passage of air from the storage space as later described. Secured to the bottom member 24, and extending upwardly therefrom, is a panel 26 spaced from the rear wall 6 to provide a passage 27 there between. The upper end of the panel 26 terminates in a forwardly directed panel 28 suitably secured, as at 29, to the inner member of the wall 5 above the upper openings 12. The panel 28 is spaced from the top wall 8 to provide a passage 30 therebetween, which is preferably substantially the same width as the passage 27. The panels 26 and 28 are connected at their side edges by panels 31 arranged parallel with and spaced from the walls 7 to provide a passage 32 therebetween, the panels 31 preferably being secured to the front wall 5 as at 33 and the bottom member 24 as at 34. Each of the panels 26, 28 and 31 is preferably formed of suitable metal sheets such as aluminum. The passageways 32 are preferably approximately one-half the width of the passageways 27 and 30 to facilitate the flow of air therethrough, as later described.

Shelves 35 are preferably arranged in the space enclosed by the front wall 5 and panels 26, 28 and 31, said shelves preferably being of perforated metal and suitably supported, for example on angles 36 and 37 secured to the front wall and the panel 26, whereby the upper surface 38 of the shelves 35 is substantially in alignment with the lower edge 39 of the openings 12, there being a shelf 35 arranged for each of the vertically spaced openings 12. The lower shelf 35 is spaced above the bottom member 24, and located therebetween is a partition 40 having suitable flanges 41 suitably secured to the inner member of the front wall 5, the panel 27 and the panel 31, in such a manner that substantially no air may pass between the partition and the respective panels.

The partition 40 and the panel 28 are provided with a plurality of elongated openings 42 and 43 respectively. The effective size of the openings 42 and 43 is controlled by plates 44 and 45 respectively, said plates having slots 46 adjacent the ends thereof to receive studs 47 secured to the partition 40 and the panel 28, wing nuts 48 being applied to said studs for securing the plates 44 and 45 in selected adjusted position relative to the openings 42 and 43, the slots and plates being of such size that the openings 42 and 43 may be completely closed or arranged to any size to completely open condition. It is to be noted that the plates 44 are on the upper surface of the partition 40 and on the lower surface of the panel 28 whereby access may be had to the wing nuts 48 and the plates for adjusting same to regulate the size of the openings 42 and 43.

The lower part of the cabinet preferably consists of vertically arranged angles 49 suitably secured to the lower ends and at the corners of the walls 5, 6 and 7, said angles preferably being connected adjacent their lower ends by suitable angles 50 and 51 extending longitudinally and transversely of the cabinet to form a rigid framework capable of supporting the weight of the cabinet and any materials therein. The sides of the lower portion of said cabinet are enclosed by panels 52 preferably extending from the lower portion of the angles 51 to the bottom of the insulated wall 7 and suitably secured to the vertically arranged angles 49. Enclosing the front of the lower portion of said cabinet is a panel 53 preferably applied by suitable clips or the like, whereby said panel may be readily removed to provide access to the equipment in the lower portion of the cabinet. The rear of the lower portion of said cabinet may be enclosed by a panel 54 if desired, said panel being suitably attached to the vertical angles 49.

Located in the lower section of the cabinet, preferably adjacent the side panel 52, is a housing 55 having its rear wall 56 substantially in alignment with the inner panel of the rear wall 6. The housing has side walls 57 and 58 and a front cover plate 59, each having engagement with the bottom member 24 of the storage space 2 and so arranged relative to the opening 25 to provide communication from the passage 27 to the housing 55. The bottom of the housing 55 is formed by a tank 60 consisting of a bottom member 61 and upwardly extending walls 62 for containing water, indicated at 63, in the bottom of the housing 55. Mounted in the housing 55 is a filter frame 64 having its rear edge substantially in alignment with the panel 26 to provide a space 65 between the rear of the filter 66 carried by the frame 64 and spaced from the rear wall 56 of the housing 55. The frame 64 preferably is formed of channel members having the flanges 67 thereof directed outwardly and mounting suitable mesh 68 and 69 on the front and rear of the filter respectively for enclosing fibrous filter material such as excelsior or other suitable foraminous filter material 70, excelsior being preferred due to its high capillary action.

The filter is mounted in the housing with the edges of the flanges 67 engaging the side walls 57 and 58 of the housing and the web of the lower frame member 71, substantially in alignment with the upper ends of the walls 62 of the tank 60, whereby the flanges on said member 71 extend downwardly into the water 63 to provide a seal at the bottom of the filter. Mounted within the flanges 67 on the upper frame member 72 is an upper tank 73 having a bottom 74 provided with perforations 75 aligning with perforations 76 in the upper frame member 72, the walls 77 of said tank extending upwardly and having engagement with the member 24. With this arrangement of the filter the only air passing from the space 65 to the space 78 between the front portion of the filter and the cover panel 59 must move through the filtering material in contact with water draining from the tank 73 through the apertures 75 and 76 into the filter media to saturate same, excessive water draining through suitable apertures 79 in the lower frame member 71 into the tank 60. The water, which preferably includes a suitable wetting agent and mold inhibiter, is then elevated by means of a suitable pump 80 located in the tank 60, and operated by a suitable motor 81 to move the water from the tank 60 through the duct 82 connecting the pump 80 with the upper tank 73. Suitable water level is maintained in the tank 60 by means of a water control which consists of a tank 83 spaced from the tank 60 and arranged substantially on the same level therewith and having communication below the respective water level of the tank by means of a pipe 84. Water is supplied to the tank 83 by means of a pipe 85 connected with a suitable water supply for flow into the tank 83 under control of a valve 86 operated by a float 87, the fall of the float 87 causing flow of water from the pipe 85 into the tank 83 to maintain the level therein, the tanks 83 and 60 being substantially on the same level and connected by an open pipe 84 to maintain the level of water the same in the two tanks.

The wall 57 of the housing 55 is provided with an aperture 88 opening into the space 78 between the filter and the front panel 59 of said housing, preferably at the upper end of the filter 66, said aperture 88 opening into a duct 89 connected with the inlet of a suitable air moving device 90, such as a fan of the sirocco type, said fan being actuated by a motor 91 and having a discharge connection 92 communicating with an opening 93 in the bottom member 24 of the storage space 2, said opening 93 preferably being centrally located relative to the sides of said storage space whereby air is drawn from the space 65 at the rear of the filter through the filter to the duct 89 and into the fan which discharges said air into the storage space below the panel 40. The air then moves to the sides of said space and upwardly through the openings 42 in the panel 40 through the perforations in the shelves 35 and the openings 43 in the upper panel 28. Air then moves freely through the passages 30, 32 and 27 to the opening 25 and into the space 65 at the rear of the filter.

In order to suitably condition the air and maintain same at the desired humidity and temperature, suitable heating coils 94 and 95 are located in the tank 60 below the water level therein, electric current being supplied to said heating coils under control of relays 96 and 96' enclosed in a housing 97 and mounted on suitable supports adjacent the housing 55, said relays being actuated by a thermostat 98 having an element 99 extending into the tank 60 below the water level therein, a thermostat controlling the current applied to the heating coils 94 and 95 to maintain the temperature of the water in the tank 60 at slightly below the temperature of the air desired in the storage space 2, whereby heated water is supplied to the upper tank 73 for drainage through the filter to completely saturate the air passing therethrough. The air is saturated and cooled as it passes through the filter, and it is, therefore, desirable to raise the temperature of said air and effect a required drop in the humidity to the percentage of relative humidity desired in the air passing through the storage space. In order to heat the saturated air, a suitable heating coil 100 is arranged in the housing 55 in alignment with the aperture 88, whereby the air passing from the housing 55 into the duct 89 will contact said heating coils 100, the heating coils being energized by an electric current under the control of a relay 101 mounted in a housing 102 located on a suitable support adjacent the housing 55, the relay 101 being controlled by a thermostat 103 having an element 104 extending into the duct 89 whereby said element is responsive to the temperature of the air passing to the inlet of the fan 90.

As shown in the wiring diagram (Fig. 6), current is supplied through suitable leads 105 and 106 under control of a master switch 107. When the switch 107 is closed, current is supplied to the motors 81 and 91 to actuate the pump 80 and fan 90 respectively and through conductors 108 and 109 to a transformer primary 110 for energizing the secondaries 111 and 112 of said transformer. The secondary 112 is connected by a conductor 113 to a thermostat switch 114 adapted to be actuated in response to the thermostat element 98 to complete the circuit through contacts 115 and 116 to the relays 96 and 96', respectively, to complete the circuit through branch conductors 117 and 118 leading to the heating elements 94 and 95, respectively. It is to be noted that when the water is heated, the thermostat breaks the circuit to the relays to disconnect the heating elements from the circuits, the heating element 94 being disconnected at a slightly lower temperature than the heating element 95, whereby the heating element 95 will form the main source of heat in maintaining the desired temperature of the water after it has once reached a predetermined temperature.

The secondary 111 is provided with conductors 119 and 120 leading to a relay 101 under control of the thermostat 103, said relay 101 actuating a switch 121 in a conductor 122 which connects the heating element 100 to the conductor 123 supplying current to the motor 81. The other terminal of the heating element 100 is connected to the conductor 124 which also serves to connect the motors 81 and 91 with the lead 106. The conductor 123 is preferably provided with a switch 125 providing selective operation of the pump motor 81, whereby the operation of said pump may be discontinued separately from the fan and heating elements if desired. If desired, suitable switches and signal devices may be applied to the circuit to provide selective control of the respective parts thereof.

In operating a device constructed and assembled as described, the apparatus is connected with a suitable source of water supply and source of electric current. A suitable mold inhibitor and water dispersion or wetting agent is placed in the tank 83 for mixture with the water therein and passage to the tank 60 through the pipe 84, such materials being added to the water as desired during the operation of the apparatus. When it is desired to operate the cabinet and apparatus therein, the master switch 107 is closed to complete the electrical circuit to the pump motor 81, fan motor 91, and transformers and since the water in the tank 60 will be cold when starting the apparatus, the thermostat element 98 will effect completion of the circuit to the relays 96 and 96' to close the circuits to the heating elements 94 and 95, energizing same and heating the water in the tank 60. The pump 80 and fan 90 are normally operated all the time the master switch 107 is closed, however, the operation of the pump may be individually stopped by opening the manual switch. When the pump is operating water is flowed through the filter raising the temperature thereof as said water is heated. As the water approaches a suitable temperature, the thermostat will open the circuit to the relay 96, effecting opening of the circuit to the heating element 94, leaving the heating element 95 to maintain the temperature in the tank 60. The relay 101, under control of the thermostat 103, also has closed the circuit to the heating element 100. The pump 80 elevates the water having the wetting agent and mold inhibitor therein into the upper tank 73, where said water drains through the apertures 75 and 76 into the excelsior or other suitable filter material and returns through the apertures 79 to the tank 60. A large quantity of water is passed through the filter to completely saturate same and maintain an excess of water in the excelsior at all times. The fan then draws the air through the filter, to the space 78 in the forward portion of the housing 55, through the ducts 89, and discharges the air into the space in the upper portion of the cabinet below the panel 40. Plates 44 and 45 are moved to adjust the size of the openings 42 and 43, respectively, to control the velocity and pressure of the air passing through the storage space 2, the air moving from under the panel 40 through the apertures 42 and rising upwardly through the perforations in the shelves 38, passing through the apertures 43 in the upper panel 28 into the passage 30 at the top of the upper portion of the cabinet. The arrangement of the passages 30, 32 and 27 permits slow movement of the air downwardly around the storage space to the opening 25 leading to the space 65 at the rear of the filter, where it again moves through the filter for reconditioning and recirculation through the cabinet.

Accurate control of the temperature and humidity of the air passing through the storage space 2 is maintained. For example, assuming it is desirable to have air at a temperature of 89° F. with a humidity of 90%, the thermostat 98 is then adjusted to control the heating elements 94 and 95 whereby the water in the tank 68 will be heated to approximately 86° F. This temperature is preferably slightly lower than the temperature desired in the storage space 2 and is determined by reference to a psychrometric chart. The rapid movement of water through the pump 80 to the tank 73 and flow thereof through the filter maintains the water temperature in the filter at slightly less than 86° F. Air moving through the filter is saturated due to the passing of said air through the small openings in the filter in contact with water. Said air is saturated and cooled to approximately 83° F. as it passes through the filter due to the evaporation of some of the water therein. Air moving through the filter under control of the fan is moved by the heating element 100 located in the inlet of the duct 89 leading to said fan. The heating coil 100 raises the temperature of the air to 89° F., which heating effects a drop in the humidity to approximately 90%. This air is then passed into the storage space as above described. The adjustment of the plates 44 and 45 effects even distribution of the air through the storage space, and due to the large quantities of the air, the entire storage space will be approximately the same temperature and the air will have approximately the same humidity in the top as in the bottom thereof. The hot air passing into the passages 30, 32 and 27 contacts the panels 26, 28 and 31, maintaining the temperature on both sides of said panels substantially the same, and thereby prevents any condensation of moisture thereon. The air returning to the filter will have only a slight change in the temperature and humidity to that in the storage space 2, depending upon the material heated in said storage space. Therefore, only a small quantity of water is required to completely saturate the recirculated air, and by positive control of the water temperature and the heating element 100, complete saturation of the air at a desired temperature is effected on passage of air through the filter, and then the air is heated as desired to effect the drop in humidity to the per cent required in the storage space 2.

When it is desired to place any material in the storage space, one of the doors 13 is opened by releasing the latch 22 and hinging said door outwardly on the hinge members 21. The large quantities of air passing through the storage space 2 and the positioning of the plates 44 and 45 to control the pressure of the air in the storage space prevents any outside air from entering said space when the door 13 is opened. After the material is placed in the cabinet on the shelves 35, the door 13 is closed and the material will be treated by the circulation of air at the desired temperature and humidity, the material being observed through the transparent panels 18 and 19 in said door, or the door opened at intervals to inspect said material. By the control of the temperature of the water, the effecting of complete saturation of the air passing through the filter with a known drop in the temperature of said saturated air, a proper heating of the saturated air by the heating element 100 effects desired drop in humidity to that desired in the storage space 2, giving accurate control for both temperature and humidity of the air. Also the circulation of large quantities of water through the filter and air through the cabinet maintains substantially uniform air-conditioning throughout the storage space 2.

It is believed obvious that I have provided a cabinet with humidity and temperature maintenance apparatus capable of providing accurate control of the humidity and temperature of air in the cabinets whereby said air may be treated to provide any desired humidity and temperature for said air.

What I claim and desire to secure by Letters Patent is:

1. In a device of the character described, a cabinet formed of insulated front, rear, top and side walls, a bottom wall, panels in the cabinet and spaced from the top, rear, side and bottom walls forming passages therebetween, said panels defining a material treating chamber in the cabinet, perforated shelves arranged in the chamber in spaced vertical relation, doors pivotally mounted on the insulated front wall for providing access to the chamber for insertion of material to be treated therein, said top and bottom panels having apertures therein for movement of air upwardly through the chamber to the passages above the chamber, an air-conditioning housing in the cabinet below the bottom wall and having an air inlet and an air outlet adjacent opposite sides thereof, means connecting the lower portions of the passage in the cabinet between the rear wall and rear panel with the housing inlet, a supply of water in the bottom of said housing, a foraminous filter in said housing between the inlet and outlet thereof and extending transversely of the flow of air therebetween and from below the water level whereby substantially all air moving from the inlet passes through said filter, means for heating the water in the housing, control means responsive to temperature of the water in the housing for regulating the water heating means, means including a water tank above the filter for flowing water downwardly through said filter for contacting and saturating the air passing therethrough, means adjacent the housing outlet for heating the saturated air, control means responsive to temperature of the air passing through the housing outlet for regulating the air heating means to control the temperature and humidity of the air, means connecting the housing outlet with the passage between the bottom wall and bottom panel for delivery of conditioned air to the material treating chamber, and means including a fan for effecting circulation of air through the chamber and housing.

2. In a device of the character described, a cabinet formed of insulated front, rear, top and side walls, panels in the cabinet and spaced from the rear, top and side walls forming passages therebetween, a bottom panel engaging the front wall, side and rear panels, said panels and front wall defining a material treating chamber in the cabinet, a bottom wall spaced below the bottom panel and forming a passage therebetween, said bottom wall having engagement with the front and side walls and side and rear panels closing the lower end of the passages between the side panels and side walls, perforated shelves arranged in the chamber in spaced vertical relation, doors pivotally mounted on the insulated front wall for providing access to the chamber for insertion of material to be treated therein, said top and bottom panels having apertures therein for movement of air upwardly through the chamber to the passages above the chamber, an air conditioning unit having an air inlet and an air outlet adjacent opposite sides thereof, means connecting the lower portion of the passage in the cabinet between the rear wall and rear panel with the air conditioning unit inlet, and means connecting the air conditioning unit outlet with the passage between the bottom wall and bottom panel for delivery of conditioned air to the material treating chamber.

3. In a device of the character described, a cabinet formed of insulated front, rear, top and side walls, panels in the cabinet and spaced from the rear, top and side walls forming passages therebetween, a bottom panel engaging the front wall, side and rear panels, said panels and front wall defining a material treating chamber in the cabinet, a bottom wall spaced below the bottom panel and forming a passage therebetween, said bottom wall having engagement with the front and side walls and side and rear panels closing the lower end of the passages between the side panels and side walls, perforated shelves arranged in the chamber in spaced vertical relation, doors pivotally mounted on the insulated front wall for providing access to the chamber for insertion of material to be treated therein, said top and bottom panels having apertures therein for movement of air upwardly through the chamber to the passages above the chamber, an air conditioning unit having an air inlet and an air outlet adjacent opposite sides thereof, means connecting the lower portion of the passage in the cabinet between the rear wall and rear panel with the air conditioning unit inlet, and means connecting the air conditioning unit outlet with the passage between the bottom wall and bottom panel for delivery of conditioned air to the material treating chamber and plates adjustably mounted on the top and bottom panels for selective movement over the apertures therein for controlling the movement of conditioned air through the chamber.

4. In a device of the character described, a cabinet formed of front, rear, top and side walls, means interiorly of the cabinet and cooperating with the front wall to form a material treating chamber therein, said means being arranged relative to the cabinet walls to form communicating passages exteriorly of and around the top, rear and sides of the material treating chamber, a cabinet bottom wall spaced below the material treating chamber and forming a passage therebetween, perforated shelves arranged in the chamber in spaced vertical relation, means providing access to the chamber for insertion of material to be treated therein, the chamber forming means having apertures therein for movement of air from one exterior passage through the chamber to another passage, an air conditioning unit having an air inlet and an air outlet connection, means connecting the side and rear passages with one of the air conditioning unit connections, and means connecting the passage between the bottom and chamber with the other air conditioning unit connection whereby conditioned air is delivered to the material treating chamber and after passing therethrough is returned to the air conditioning unit inlet.

5. In a device of the character described, a cabinet formed of front, rear, top and side walls, means interiorly of the cabinet and cooperating with the front wall to form a material treating chamber therein, said means being spaced from the rear, top and side walls of the cabinet to form communicating passages exteriorly of and around the top, rear and sides of the material treating chamber, a cabinet bottom wall spaced below the material treating chamber and forming a passage therebetween, perforated shelves arranged in the chamber in spaced vertical relation, means providing access to the chamber for insertion of material to be treated therein, the chamber forming means having apertures in the top and bottom portions thereof for movement of air upwardly through the chamber to the passages thereabove, an air conditioning unit having an air inlet and an air outlet, means connecting the side and rear passages with the air conditioning unit inlet, and means connecting the air conditioning unit outlet with the passage between the bottom and chamber whereby conditioned air is delivered to the material treating chamber and after passing therethrough is returned to the air conditioning unit inlet.

JOHN S. WHINERY.

REFERENCES CITED

The following references are of record in the file of this patent:

UNITED STATES PATENTS

| Number | Name | Date |
|---|---|---|
| 1,024,763 | Anderson | Apr. 30, 1912 |
| 1,546,415 | Stacey, Jr., et al. | July 21, 1925 |
| 1,784,727 | Harris | Dec. 9, 1930 |
| 1,859,613 | Bailey | May 24, 1932 |
| 1,955,406 | Carrier | Apr. 17, 1934 |
| 1,968,764 | Harris | July 31, 1934 |
| 2,105,088 | Lydon et al. | Jan. 11, 1938 |
| 2,165,979 | Nicholson | July 11, 1939 |
| 2,182,620 | Cano | Dec. 5, 1939 |
| 2,193,911 | Wright | Mar. 19, 1940 |
| 2,198,890 | Stillwell | Apr. 30, 1940 |
| 2,201,389 | DeGive | May 21, 1940 |
| 2,236,359 | Armstrong | Mar. 25, 1941 |
| 2,294,530 | Wiese | Sept. 1, 1942 |
| 2,391,558 | Essick | Dec. 25, 1945 |
| 2,400,677 | Allen | May 21, 1946 |

OTHER REFERENCES

Aerosol Wetting Agents: Copyright 1941, Am. Cyan. & Chem. Corp., page 57.